United States Patent
Chalk

(10) Patent No.: US 10,883,483 B2
(45) Date of Patent: Jan. 5, 2021

(54) SEAL ASSEMBLY FOR RECIPROCATING COMPRESSOR

(71) Applicant: Air Products and Chemicals, Inc., Allentown, PA (US)

(72) Inventor: David Jonathan Chalk, Slatington, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 102 days.

(21) Appl. No.: 16/145,437

(22) Filed: Sep. 28, 2018

(65) Prior Publication Data

US 2020/0102946 A1 Apr. 2, 2020

(51) Int. Cl.
| | |
|---|---|
| *F16J 15/56* | (2006.01) |
| *F16J 15/40* | (2006.01) |
| *F16J 15/3284* | (2016.01) |
| *F04B 39/04* | (2006.01) |
| *F16J 15/38* | (2006.01) |
| *F04B 39/12* | (2006.01) |

(52) U.S. Cl.
CPC .......... *F04B 39/045* (2013.01); *F04B 39/128* (2013.01); *F16J 15/3284* (2013.01); *F16J 15/38* (2013.01); *F16J 15/40* (2013.01); *F16J 15/56* (2013.01)

(58) Field of Classification Search
CPC ...... F04B 39/045; F04B 39/04; F04B 39/041; F04B 39/042; F04B 39/128; F16J 15/3284; F16J 15/38; F16J 15/40; F16J 15/56
USPC ........................................................ 277/345
See application file for complete search history.

(56) References Cited

U.S. PATENT DOCUMENTS

| | | | | |
|---|---|---|---|---|
| 2,706,665 A | | 4/1955 | Brooks et al. | |
| 3,124,502 A | * | 3/1964 | Radke ....................... | F16J 15/20 428/66.4 |
| 3,146,940 A | * | 9/1964 | McCrory .............. | F04B 35/008 417/571 |
| 3,216,651 A | * | 11/1965 | King ....................... | F16J 15/008 417/364 |
| 3,357,428 A | * | 12/1967 | Carlson ............... | A61M 16/022 128/204.23 |

(Continued)

FOREIGN PATENT DOCUMENTS

| | | |
|---|---|---|
| CN | 204458258 U | 7/2015 |
| DE | 1019432 B | 11/1957 |
| EP | 3330538 A | 6/2018 |

OTHER PUBLICATIONS

"Reducing Emissions when Taking Compressors Off-Line", U.S. Environmental Protection Agency, Oct. 2006.

(Continued)

*Primary Examiner* — Nathan Cumar
(74) *Attorney, Agent, or Firm* — Matthew R. Weaver

(57) ABSTRACT

A seal assembly for a reciprocating rod of a reciprocating compressor, a reciprocating compressor with the seal assembly, and a method of operating the reciprocating compressor with the seal assembly to prevent leakage of gas once the compressor has been shut down. The pressure difference between opposite sides of a static seal is kept low during normal operation to reduce wear of the static seal. When the compressor is shut down, a high pressure difference between opposite sides of the static seal assists with sealing.

20 Claims, 5 Drawing Sheets

(56) References Cited

U.S. PATENT DOCUMENTS

| | | | |
|---|---|---|---|
| 3,832,935 A * | 9/1974 | Syassen | F02G 1/0535 |
| | | | 92/156 |
| 3,848,877 A * | 11/1974 | Bengtsson | F02G 1/0535 |
| | | | 277/513 |
| 3,889,958 A * | 6/1975 | Bennett | F16J 15/3224 |
| | | | 277/556 |
| 4,093,239 A * | 6/1978 | Sugahara | F16J 15/40 |
| | | | 277/514 |
| 4,469,017 A | 9/1984 | Hanlon | |
| 2006/0275716 A1 | 7/2006 | Marty et al. | |
| 2012/0211945 A1 | 8/2012 | Linder-Silwester et al. | |
| 2013/0047635 A1 * | 2/2013 | Shultz | F25B 45/00 |
| | | | 62/77 |
| 2015/0330511 A1 | 11/2015 | Maggi et al. | |

OTHER PUBLICATIONS

"Mechanical Packing design and theory of operation", CPI Packings, reprinted from 1968 publication.

* cited by examiner

SEAL ASSEMBLY FOR RECIPROCATING COMPRESSOR

BACKGROUND

Compressors and other reciprocating pumps generally have a piston rod that moves into and out of a high (or low) pressure system. The pathway that the piston rod follows provides a natural leak path for the fluid (gas or liquid) into or out of the cylinder. Conventionally, rod packing is designed to seal the high pressure chamber of the compressor but due to the segmented design of these sealing systems, some leakage occurs.

When the compressor or pump is non-operational, however, the piston rod is static or not moving. The rod packing may not seal properly when the compressor, pump, or valve, in certain embodiments, is shut down but at operating pressures. The fluid, such as for example air or natural gas, may leak past the packing rings of the rod packing to the atmosphere. At best, the leakage results in system loss that must be replaced resulting in inefficiencies. At worst, the leakage results in an environmental contamination hazard that is regulated by government agencies.

There are numerous problems with allowing a compressor to leak to atmosphere after shutdown. One issue regards the potential for air ingress once gas pressure in the machine has dropped to atmospheric pressure. With no pressure in the machine, minor leakage paths have the potential of allowing air to get inside the compressor and into the process stream, producing a potentially explosive atmosphere in the compressor or downstream of the compressor. Water that may enter the machine during shutdown is another problem that may produce contaminants in the process flow. Loss of product is generally small but is another problem especially if the gas leaking out is flammable, corrosive or otherwise a problem to vent to atmosphere. In general, allowing gas to leak from a compressor after shutdown is acceptable only if that gas is air.

The problem with having a seal of some sort that can prevent leakage to atmosphere during shutdown is one of the more difficult issues to solve. Packings that normally prevent leakage of process gas to atmosphere will leak to some degree under normal operation because they are made of numerous segments which allow some small amount of leakage between those segments. They are made of segments to allow for a considerable amount of wear over the life of operation. Without segments that can move relative to each other, the amount of wear the seal can withstand before "wearing out" is extremely small. To stop leakage altogether however, the seal must be made of a single piece, just like an O-ring. But this configuration would present the problem of stopping all leakage that would come through the packings under normal operation, and the seal would quickly wear out.

To overcome these issues, the general concept has been to prevent the shutdown seal from contacting the shaft until the shaft has stopped moving so wear can be avoided.

Solutions to preventing leakage from the compressor shaft during shutdown include isolating the compressor and allowing the pressure to leak down to zero, and providing a type of seal used only during shutdown of the system.

Static sealing assemblies are described for example in U.S. Pat. No. 4,469,017 and EP 3 330 538 A1.

Industry desires improved static sealing assemblies.

Industry desires static sealing assemblies that are simple and minimize cost while providing for leak-tight sealing once the compressor is shut down.

BRIEF SUMMARY

The present disclosure relates to a seal assembly for a reciprocating rod of a reciprocating compressor, a reciprocating compressor with the seal assembly, and a method of operating the reciprocating compressor with the seal assembly.

There are several aspects of the invention as outlined below. The reference numbers and expressions set in parentheses are referring to an example embodiment explained further below with reference to the figures. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A seal assembly (10) for a reciprocating rod (20) of a reciprocating compressor, the seal assembly having a first end (11) and a second end (12), the first end (11) of the seal assembly disposed towards a cylinder end of the reciprocating rod, the second end (12) of the seal assembly disposed towards a crankcase end of the reciprocating rod (20), the reciprocating rod (20) having a longitudinal axis (21), the seal assembly comprising:

one or more packing retainers (30) (a.k.a. "packing cups"), each of the one or more packing retainers (30) containing a respective packing (32) configured to contact the reciprocating rod (20);

an unsegmented seal (40) configured to form a sealing interface with the reciprocating rod (20), wherein the unsegmented seal (40) is arranged at an axial position closer to the second end (12) of the seal assembly relative to the axial position of the one or more packing retainers (30), the axial position defined with respect to the longitudinal axis (21) of the reciprocating rod (20);

a fluid passage (50) having a first end (51) and a second end (52), the first end (51) located at an axial position between the unsegmented seal (40) and at least one respective packing (32) of the one or more packing retainers (30), the axial position of the first end (51) of the fluid passage (50) defined with respect to the longitudinal axis (21) of the reciprocating rod (20), the fluid passage (50) operatively configured to vent a fluid leaking past the at least one respective packing (32); and a valve (60) in fluid communication with the second end (52) of the fluid passage (50).

Aspect 2. The seal assembly according to aspect 1 wherein the inner diameter of the unsegmented seal (40) is the same as the outer diameter of the reciprocating rod (20).

Aspect 3. The seal assembly according to aspect 1 or aspect 2 further comprising a vent member (70) (a.k.a. "vent cup") wherein the fluid passage (50) passes through the vent member (70).

Aspect 4. The seal assembly according to aspect 3 wherein the vent member (70) contains a respective packing (72).

Aspect 5. The seal assembly according to any one of aspects 1 to 4 wherein the packing (32) contained in each of the one or more packing retainers (30) is a segmented packing.

Aspect 6. The seal assembly according to any one of aspects 1 to 4 wherein the packing (32) contained in each of the one or more packing retainers (30) is a rope packing.

Aspect 7. The seal assembly according to any one of aspects 1 to 6 further comprising a bushing (80) for the reciprocating rod (20), the bushing (80) in a position effective to reduce the compressive load on the unsegmented seal (40).

Aspect 8. The seal assembly according to any one of aspects 1 to 7 further comprising a seal carrier (45) in fixed spaced relation to the one or more packing retainers (30), the seal carrier (45) for retaining the unsegmented seal (40).

Aspect 9. The seal assembly according to aspect 8 wherein the seal carrier (45) is configured to allow the unsegmented seal (40) to move radially (in response to radial movement of the reciprocating rod (20)).

Aspect 10. The seal assembly according to any one of aspects 1 to 9 further comprising a pressure transducer (100) operatively disposed to sense the pressure in a transfer line between the second end (52) of the fluid passage (50) and the valve (60).

Aspect 11. A reciprocating compressor comprising:
a reciprocating rod (20); and
a seal assembly (10) according to any one of aspects 1 to 10.

Aspect 12. A method of operating the reciprocating compressor according to aspect 11 wherein any fluid leaking past the at least one respective packing (32) is vented through the valve (60) when the reciprocating compressor is operating; and wherein the valve (60) is closed when the reciprocating compressor is stopped.

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from the scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "plurality" means "two or more than two."

The present disclosure relates to a seal assembly for a reciprocating rod of a reciprocating compressor, a reciprocating compressor with the seal assembly, and a method of operating the reciprocating compressor with the seal assembly.

The seal assembly is described with reference to the figures, wherein like reference numbers refer to like elements in the figures.

Figure 1:
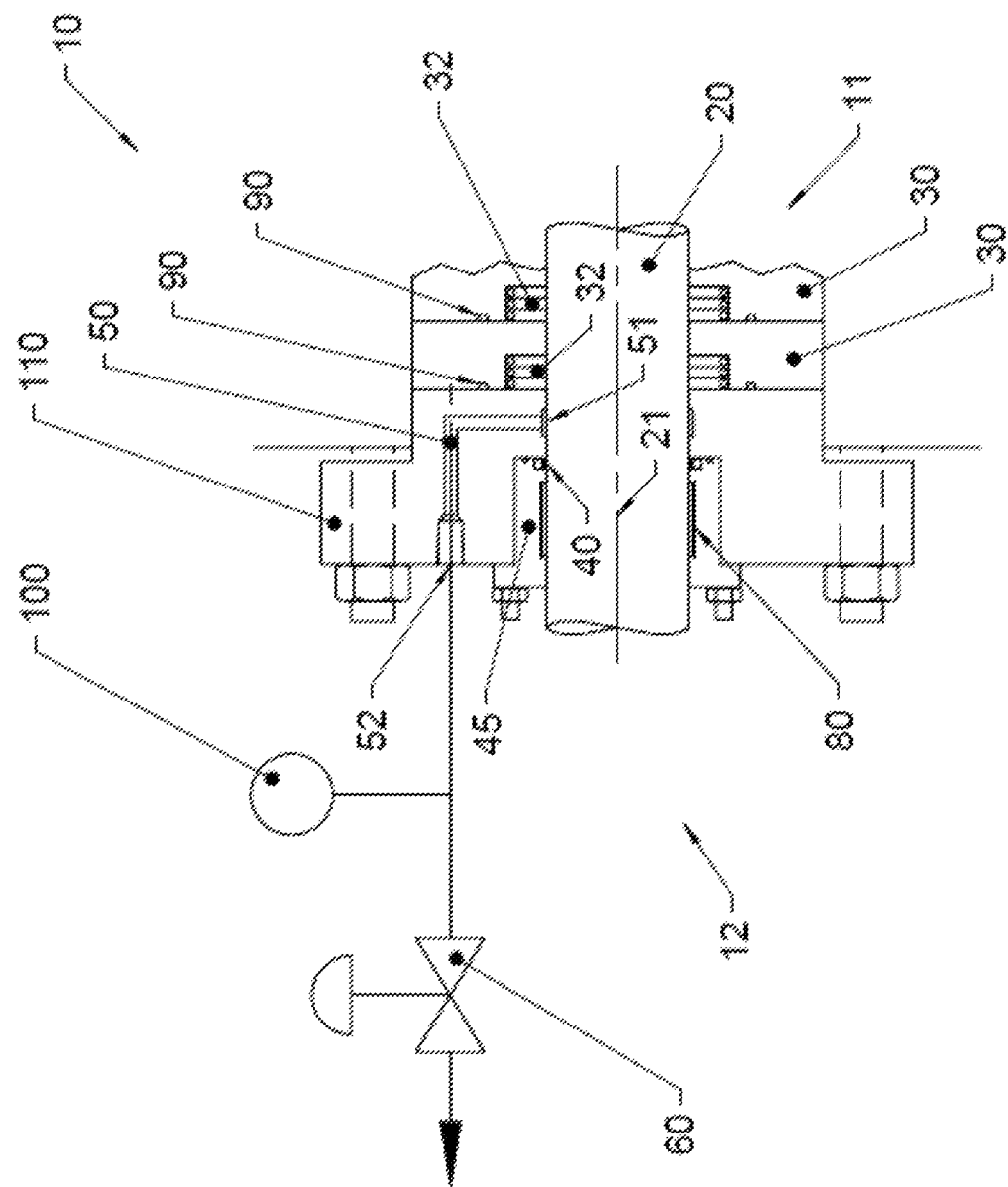
FIG. 1 illustrates a sealing assembly with a bushing and fluid passage with a port for venting leaking gas where the port is built into the flange.
Figure 2:
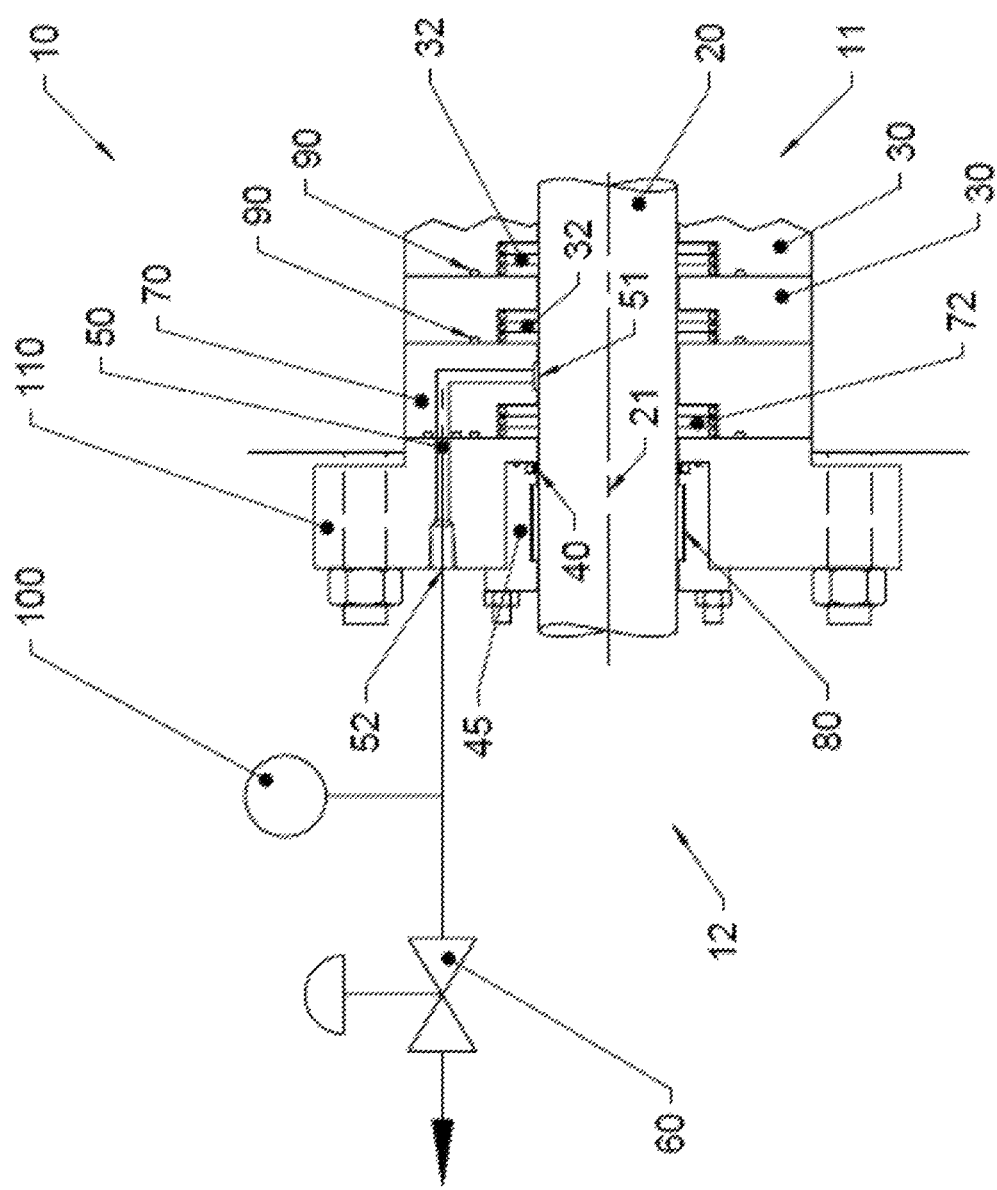
FIG. 2 illustrates a sealing assembly with a bushing and fluid passage with a port for venting leaking gas where the port is built into a vent cup.
Figure 3:
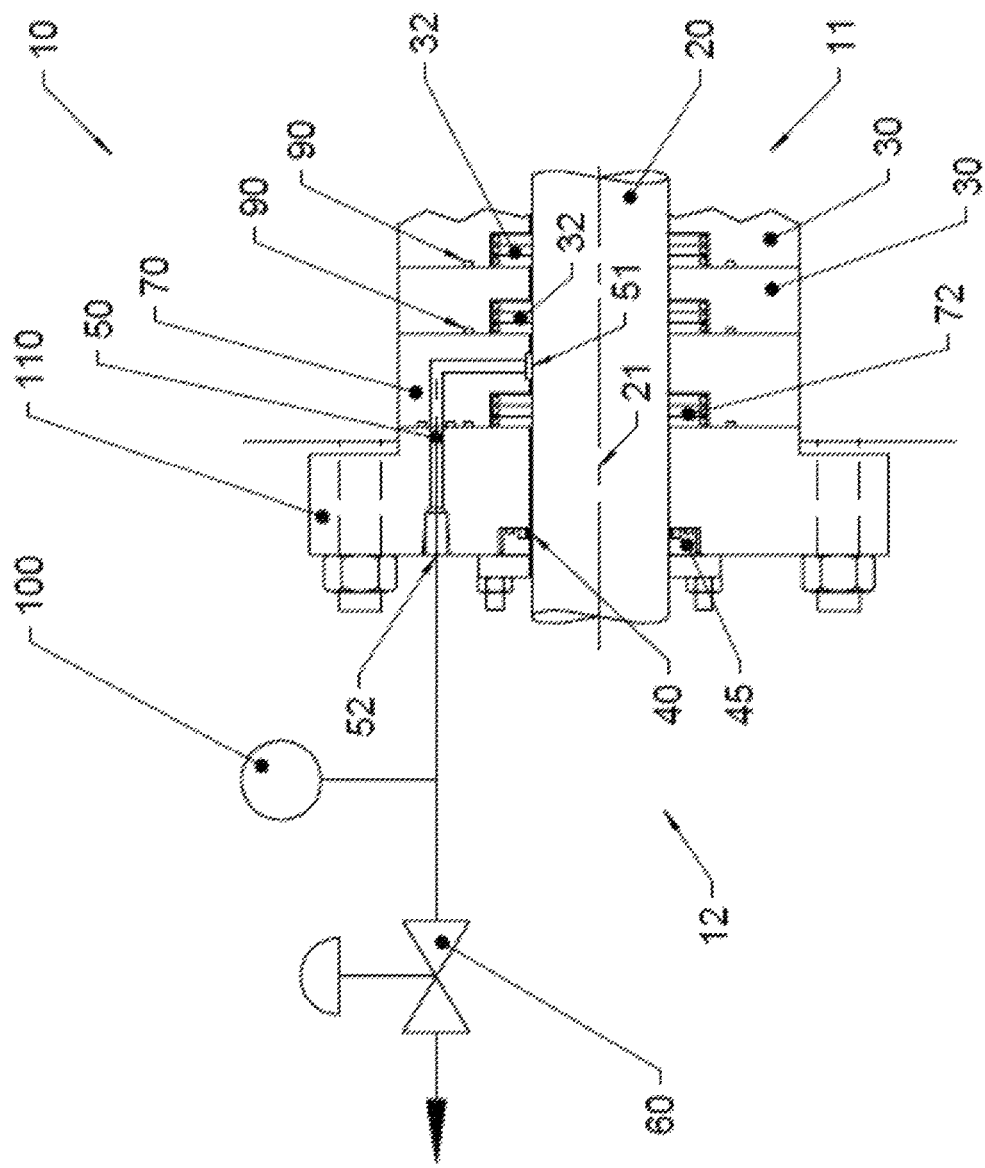
FIG. 3 illustrates a sealing assembly with a seal carrier with a floating type seal and a fluid passage with a port for venting leaking gas where the port is built into a vent cup.

As shown in FIGS. 1-3, the seal assembly 10 for a reciprocating rod 20 of a reciprocating compressor has a first end 11 and a second end 12. The first end 11 of the seal assembly is disposed towards a cylinder end of the reciprocating rod, and the second end 12 of the seal assembly is disposed towards a crankcase end of the reciprocating rod 20. The reciprocating rod 20 has a longitudinal axis 21.

The seal assembly comprises one or more packing retainers 30, so-called "packing cups" by those skilled in the art. Each of the one or more packing retainers 30 contains a respective packing 32 configured to contact the reciprocating rod 20 and provide a seal to prevent leakage of the fluid. The packing 32 contained in each of the one or more packing retainers 30 may be a segmented packing, a rope packing, or any other type of packing known in the art.

The packing retainers 30 are mounted to a flange 110. A seal may be provided between the packing retainer 30 and the flange by an O-ring seal 90.

Respective O-ring seals 90 may provide sealing between each of the packing retainers 30.

The seal assembly comprises an unsegmented seal 40 configured to form a continuous sealing interface with the reciprocating rod 20. The unsegmented seal 40 is arranged at an axial position closer to the second end 12 of the seal assembly relative to the axial position of the one or more packing retainers 30. The axial position is defined with respect to the longitudinal axis 21 of the reciprocating rod 20. The unsegmented seal 40 may be the same as the outer diameter of the reciprocating rod 20. An unsegmented seal is a continuous seal about the circumference of the reciprocating rod 20, not formed by multiple segments about the circumference.

Figure 4A:
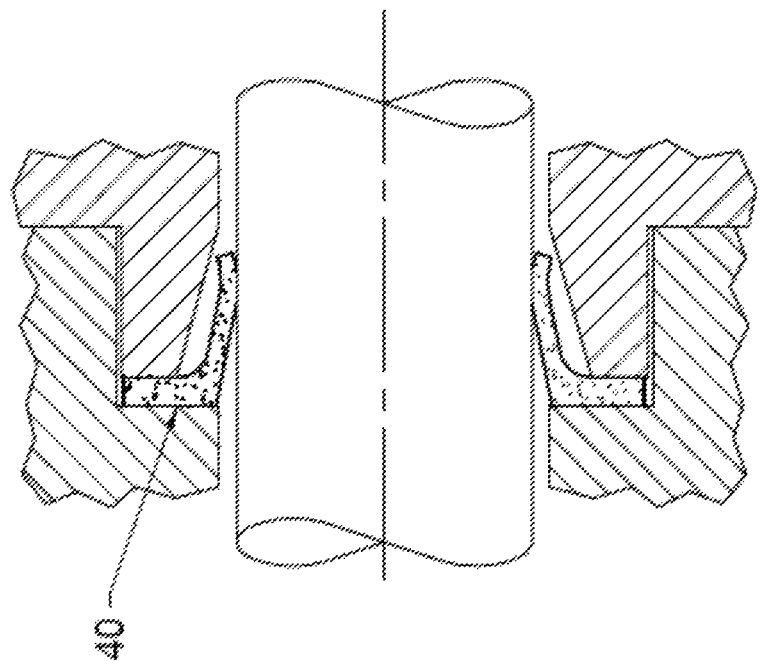
FIG. 4a illustrates a sealing assembly where the unsegmented seal 40 is a spring-energized U-cup seal.
Figure 4B:
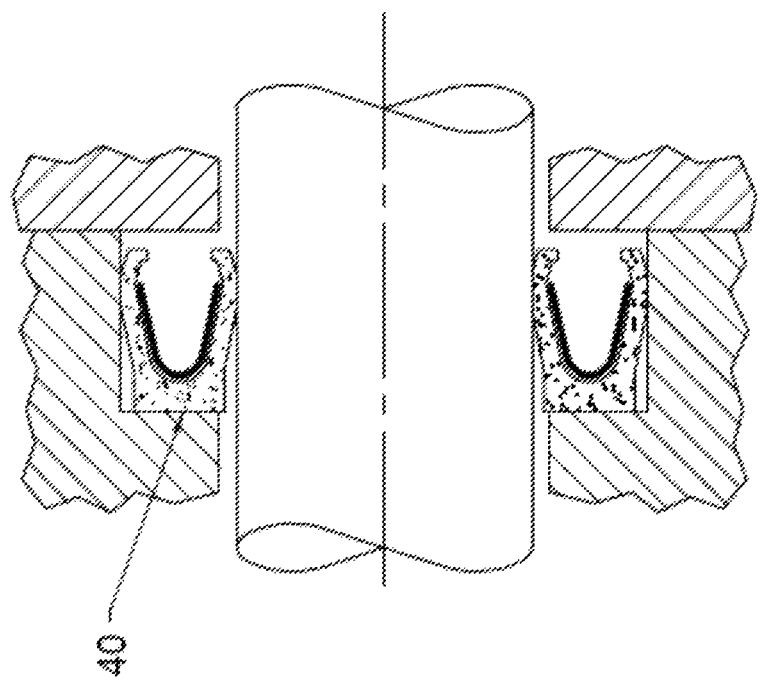
FIG. 4b illustrates a sealing assembly where the unsegmented seal 40 is a U-cup seal that is not spring-energized.

The unsegmented seal 40 may be a U-cup seal, which may be spring energized as shown in FIG. 4a, or not spring energized as shown in FIG. 4b.

The unsegmented seal may be an O-ring seal.

Figure 5:
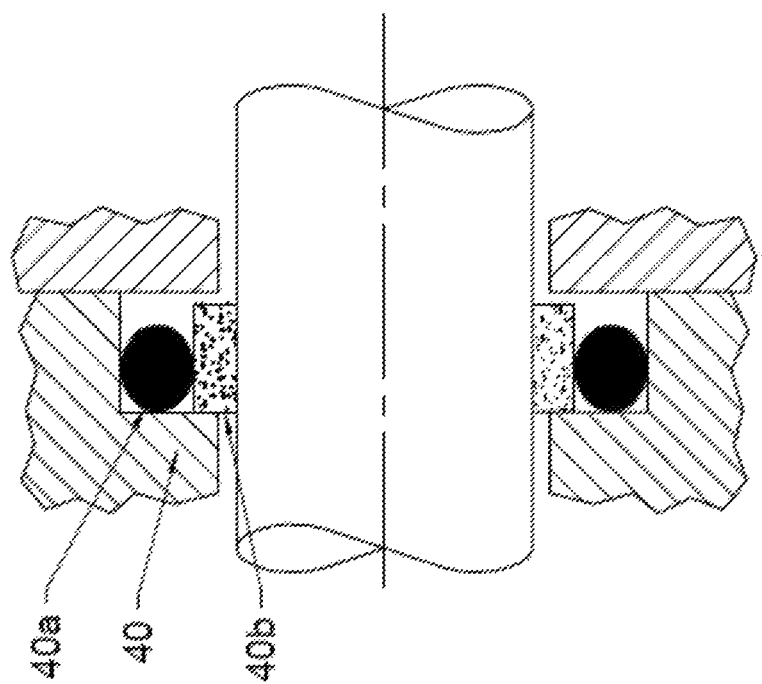
FIG. 5 illustrates a sealing assembly where the unsegmented seal 40 is a two-part seal comprising an O-ring 40a with a plastic cap 40b.

The unsegmented seal 40 may be a two-part seal comprising an O-ring 40a with a plastic cap 40b as shown in FIG. 5. The plastic caps improve longevity of the seal. The plastic cap 40b is positioned against the sliding surface (i.e. the reciprocating rod 20), so it's the plastic cap 40b that wears, not the O-ring 40a.

The unsegmented seal 40 may be made from any desired plastic or elastomer. It is more common for plastic seals to be spring energized and elastomeric seals not to be spring energized.

The plastic or elastomer may be selected to be compatible with the fluid intended for compression in the compressor.

The unsegmented seal 40 has no channels that would provide a leak path.

The unsegmented seal 40 has no channel-through porosity.

The unsegmented seal 40 is not a rope packing.

The seal assembly comprises a fluid passage 50 having a first end 51 and a second end 52. The first end 51 is located at an axial position between the unsegmented seal 40 and at least one respective packing 32 of the one or more packing retainers 30. The axial position of the first end 51 of the fluid passage 50 is defined with respect to the longitudinal axis 21 of the reciprocating rod 20. The fluid passage 50 is operatively configured to vent a fluid leaking past the at least one respective packing 32.

FIG. 1 shows the port at the first end 51 of the fluid passage 50 defined within the flange 110.

The seal assembly comprises a valve 60 in fluid communication with the second end 52 of the fluid passage 50. The valve 60 is operatively connected to the second end 52 of the fluid passage 50 to allow or prevent flow through the fluid passage 50.

The seal assembly may comprise a vent member 70, a so-called "vent cup" wherein the fluid passage 50 passes through the vent member 70. At least a portion of the fluid passage is defined within the vent member. The vent member may contain a respective packing 72.

FIG. 2 and FIG. 3 show the port at the first end 51 of the fluid passage 50 defined within a vent member 70.

Through the use of the fluid passage 50 and the valve 60, the pressure difference on either side of the unsegmented seal 40 is small. While the reciprocating rod 20 is constantly riding on the unsegmented seal 40, because of the low pressure difference, the contact pressure is relatively low and the motion does not cause rapid wear due to the very low contact pressure.

The reciprocating rod 20 on a reciprocating compressor typically moves in a radial direction very slightly in addition to the main axial direction. This radial motion will tend to compress the unsegmented seal 40 preferentially on one side, potentially causing wear on the unsegmented seal 40 due to increased contact load.

As shown in FIG. 1 and FIG. 2, the seal assembly may comprise a bushing 80 for the reciprocating rod 20. The bushing 80, if present, is in a position effective to reduce the compressive load on the unsegmented seal 40. The bushing 80, if present, is positioned next to the unsegmented seal 40 to keep the reciprocating rod 20 centered and prevent undue compressive loads on the unsegmented seal 40.

The seal assembly may comprise a seal carrier 45 in fixed spaced relation to the one or more packing retainers 30. The seal carrier 45 retains the unsegmented seal 40. The seal carrier 45 may be fixably attached to the mounting flange 110.

The seal carrier 45 shown in FIG. 3 is configured to allow the unsegmented seal 40 to move radially in response to radial movement of the reciprocating rod 20. The unsegmented seal 40 may be held in the seal carrier 45 such that the unsegmented seal 40 is permitted to move radially with the radial movement of the reciprocating rod 20.

The seal assembly may comprise a pressure transducer 100 operatively disposed to sense the pressure in a transfer line between the second end 52 of the fluid passage 50 and the valve 60. By monitoring the pressure in the transfer line with the pressure transducer 100, proper operation of the seal can be verified and leakage through the packings can be monitored so that the packings, when worn out, can be replaced.

The present disclosure also relates to a reciprocating compressor with the seal assembly as described above. The reciprocating compressor comprises a reciprocating rod 20 and a seal assembly 10 as described above. The other components of the reciprocating compressor may be as known in the art.

The present disclosure also relates to a method of operating the reciprocating compressor with the seal assembly described above. The method comprises venting any fluid leaking past the packings 32 through the valve 60 when the reciprocating compressor is operating, and closing the valve and keeping the valve closed when the reciprocating compressor is stopped.

Example

Seals wear over the course of their useful lifetime and eventually begin to leak once too much material is lost. The amount of material lost during operation is a function of both contact pressure and the total distance over which the seal has traveled. The higher the contact pressure and the greater the total sliding distance, the higher will be the total loss of material. This loss of material eventually results in the seal 'wearing out'. The sliding distance is equal to the velocity of the sliding multiplied by the total time, so the total amount of material lost during operation per unit time is linearly related to the contact pressure (P) and the velocity (V). The higher the PV, the faster the seal will wear out.

To increase the amount of time a seal can remain in service, either the velocity can be reduced, which may not be possible for a given application, or the contact pressure can be reduced. The contact pressure is primarily a function of the pressure differential across the seal, so the higher the pressure differential, the faster the seal will wear out.

In the present invention, the lifetime of the unsegmented seal is increased by providing a minimal contact pressure during normal operating when the seal is exposed to sliding.

Unsegmented seals like those described in the present disclosure are commonly made of wear resistant materials and can last for roughly 1000 hours while under pressure of 690 kPa (100 psi) differential and while operating at normal velocity. However, a pressure of 690 kPa (100 psi) differential is much lower than the applications considered for this sealing assembly, such as for compressing hydrogen for hydrogen fueling.

If the differential seal pressure is increased to 6900 kPa (1000 psi), the wear life would be reduced by a factor of 10, resulting in seal life of about 100 hours.

Seal lifes of 100 hours are too short for practical use. However by removing the pressure differential from the seal, the remaining seal pressure which is caused only by the stretching of the seal over the shaft, is very low. The contact pressure of the seal with no pressure differential across it and only pressure caused by the stretching of the seal over the shaft, is lower than the known seal by a factor of 5 to 10 so the seal life will increase by that amount.

The rate of seal material removed during operation is linearly proportional to contact pressure and sliding velocity. Reducing the contact pressure by essentially eliminating the pressure differential across the seal during operation is expected to increase the useful life of the seal to between 5000 and 10,000 hours.

What is claimed:

1. A seal assembly for a reciprocating rod of a reciprocating compressor, the seal assembly having a first end and a second end, the first end of the seal assembly disposed towards a cylinder end of the reciprocating rod, the second end of the seal assembly disposed towards a crankcase end of the reciprocating rod, the reciprocating rod having a longitudinal axis, the seal assembly comprising:
   one or more packing retainers, each of the one or more packing retainers containing a first packing configured to contact the reciprocating rod;
   an unsegmented seal configured to form a sealing interface with the reciprocating rod, wherein the unsegmented seal is arranged at an axial position closer to the second end of the seal assembly relative to the axial position of the one or more packing retainers, the axial position defined with respect to the longitudinal axis of the reciprocating rod;
   a fluid passage having a first end and a second end, the first end located at an axial position between the unsegmented seal and the first packing of the one or more packing retainers, the axial position of the first end of the fluid passage defined with respect to the longitudinal axis of the reciprocating rod, the fluid passage operatively configured to vent a fluid leaking past the first packing; and
   a valve in fluid communication with the second end of the fluid passage;
   a vent member, the fluid passage passing through the vent member, a second packing disposed in the vent member such that the vent member contains the second packing.

2. The seal assembly as claimed in claim 1 wherein the inner diameter of the unsegmented seal is the same as the outer diameter of the reciprocating rod.

3. The seal assembly as claimed in claim 1 wherein the vent member defines a portion of the fluid passage that passes through the vent member.

4. The seal assembly as claimed in claim 3 wherein the vent member is a vent cup that contains the second packing and defines the portion of the fluid passage that passes through the vent member.

5. The seal assembly as claimed in claim 1 wherein the first packing in each of the one or more packing retainers is a segmented packing.

6. The seal assembly as claimed in claim 1 wherein the packing contained in each of the one or more packing retainers is a rope packing.

7. The seal assembly as claimed in claim 1 further comprising:
   a bushing for the reciprocating rod, the bushing in a position effective to reduce the compressive load on the unsegmented seal.

8. The seal assembly as claimed in claim 1 further comprising:
   a seal carrier in fixed spaced relation to the one or more packing retainers, the seal carrier for retaining the unsegmented seal.

9. The seal assembly as claimed in claim 8 wherein the seal carrier is configured to allow the unsegmented seal to move radially.

10. The seal assembly as claimed in claim 1 further comprising:
    a pressure transducer operatively disposed to sense the pressure in a transfer line between the second end of the fluid passage and the valve.

11. A reciprocating compressor comprising:
    a reciprocating rod; and
    a seal assembly as claimed in claim 1.

12. A method of operating the reciprocating compressor as claimed in claim 11 wherein any fluid leaking past the first packing is vented through the valve when the reciprocating compressor is operating; and
    wherein the valve is closed when the reciprocating compressor is stopped.

13. The seal assembly as claimed in claim 1 wherein the unsegmented seal comprises:
    an annular seal member and a polymeric cap positioned between the reciprocating rod and the annular seal member to contact the reciprocating rod.

14. The seal assembly as claimed in claim 13, wherein the annular seal member is an O-ring.

15. The seal assembly as claimed in claim 13, wherein the polymeric cap is a plastic cap.

16. The seal assembly as claimed in claim 13, wherein the polymeric cap is comprised of a plastic that is compatible with the fluid; and
    wherein the polymeric cap is positioned so that the annular seal member does not directly contact the reciprocating rod.

17. The seal assembly as claimed in claim 13, wherein the unsegmented seal is configured as a U-cup seal.

18. The seal assembly of claim 1, wherein the unsegmented seal is configured as a U-cup seal.

19. The seal assembly of claim 1, wherein the unsegmented seal is continuous seal about a circumference of the reciprocating rod that is formed by a single seal body.

20. The seal assembly of claim 19, comprising:
    a polymeric cap positioned between the reciprocating rod and the single seal body, the polymeric cap positioned to contact the reciprocating rod so that the single seal body does not directly contact the reciprocating rod.

* * * * *